(No Model.)

F. A. REDMON.
MOLD FOR FORMING ARTICLES FROM BITUMINOUS COMPOSITIONS.

No. 574,450. Patented Jan. 5, 1897.

Witnesses.

Inventor.
Frederick A. Redmon
by Spear & Seely
Attorneys

UNITED STATES PATENT OFFICE.

FREDERICK A. REDMON, OF SAN FRANCISCO, CALIFORNIA.

MOLD FOR FORMING ARTICLES FROM BITUMINOUS COMPOSITIONS.

SPECIFICATION forming part of Letters Patent No. 574,450, dated January 5, 1897.

Application filed May 12, 1896. Serial No. 591,231. (No model.)

*To all whom it may concern:*

Be it known that I, FREDERICK A. REDMON, a citizen of the United States, residing at San Francisco, in the county of San Francisco and State of California, have invented certain new and useful Improvements in Molds for Forming Articles from Bituminous Compositions; and I do hereby declare that the following is a full, clear, and exact description thereof.

My invention relates to molds for forming articles or structures from compositions of a bituminous or asphaltic nature. Such compositions are exceedingly valuable for making cheap and durable pipe, paving-blocks, &c., but on account of their great adhesiveness when pressed hot in a metallic mold it has been found exceedingly difficult to remove the finished article from the mold.

The object of my invention is to provide a metallic mold with a pressing-surface to which bituminous compositions will adhere not at all or very slightly; and the invention by which I accomplish this object consists in a metallic mold having an amalgamated pressing-surface.

I have found in practice that bituminous compositions have no affinity for a surface of mercury, and that the adhesion between them is very slight, so that articles molded under heavy hydraulic or other pressure in a metallic mold having an amalgamated surface are easily detachable from such surface.

For the purpose of illustrating my invention I have provided drawings to accompany this specification, in which are represented the three members of a well-known kind of mold for pressing rectangular forms.

Figure 1:
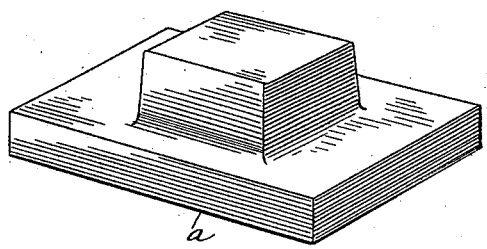
Figure 2:
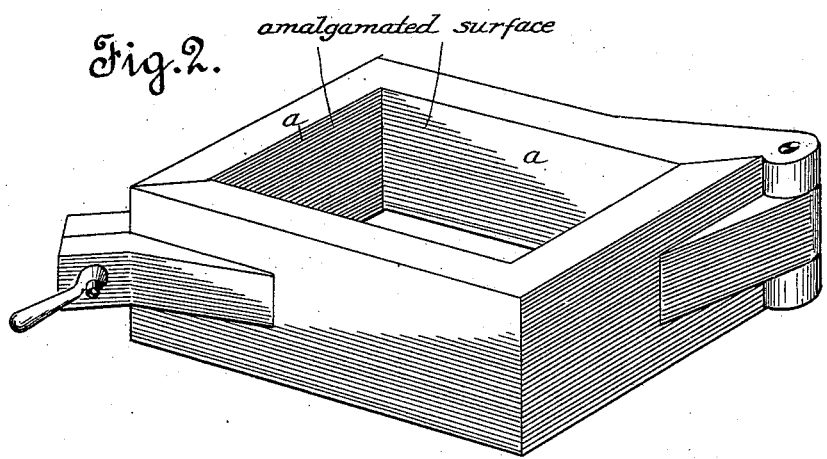
Figure 3:
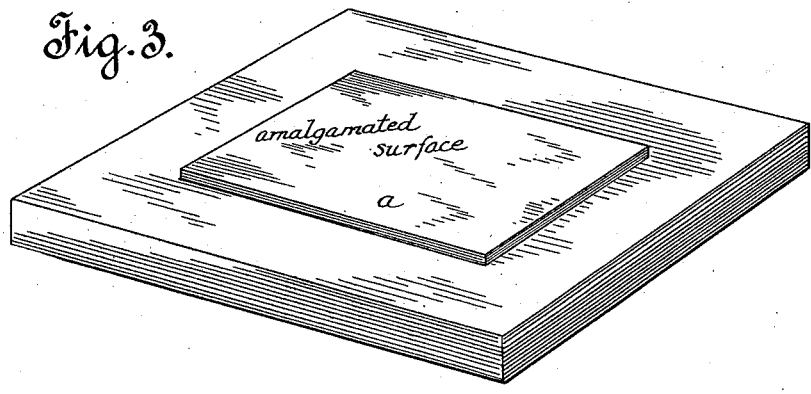

Figure 1 is the cover or pressure plate of the mold. Fig. 2 is the body of the mold, composed of two sections hinged together. Fig. 3 is the base-plate upon which the body fits.

The form, shape, and construction of the metallic molds constitute no part of my invention. Molds of any kind can be used, and articles of any shape and size for any purpose can be formed in such molds from bituminous compositions. The mold shown in the drawings is therefore only illustrative of one of many different kinds of metallic molds. Such molds can be made of any suitable metal the pressing-surface of which will amalgamate with mercury. Hence such molds can be cast or formed of brass or of copper. If made of iron or steel, the pressing-surfaces can be of copper or other good amalgamating metal.

Whatever the kind, shape, or structure of the mold, its surface *a*, which comes in contact with the composition, is treated with mercury applied in any convenient way, giving such surface the characteristic "greasy" quality imparted by mercury when allied with another substance. To this surface of amalgam the bituminous composition will not adhere at all, or, at the most, very slightly, and hence while the metal mold is perfectly effective for forming the article the difficulty of removing it is entirely obviated. I thus make it practicable to mold many and various articles from this cheap and durable material by obviating the difficulties which have made its general use impracticable.

What I claim is—

1. A metallic mold for forming articles from bituminous compositions, having an amalgamated pressing-surface.

2. A mold for forming articles from bituminous compositions, having a metallic pressing-surface amalgamated with mercury.

In testimony whereof I have affixed my signature, in presence of two witnesses, this 1st day of May, 1896.

FREDERICK A. REDMON.

Witnesses:
L. W. SEELY,
F. H. SEELY.